United States Patent
Banker et al.

(10) Patent No.: US 11,629,659 B2
(45) Date of Patent: Apr. 18, 2023

(54) METHODS AND SYSTEM TO SHUTDOWN AN ENGINE

(71) Applicant: Ford Global Technologies, LLC, Dearborn, MI (US)

(72) Inventors: Adam Banker, Canton, MI (US); Jeffrey Doering, Canton, MI (US); Chris Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/304,082

(22) Filed: Jun. 14, 2021

(65) Prior Publication Data

US 2022/0397072 A1 Dec. 15, 2022

(51) Int. Cl.
| | |
|---|---|
| *F02D 41/04* | (2006.01) |
| *F02D 41/06* | (2006.01) |
| *F02D 41/40* | (2006.01) |
| *F02D 13/02* | (2006.01) |
| *F02B 39/10* | (2006.01) |
| *F02D 41/00* | (2006.01) |

(52) U.S. Cl.
CPC ............ *F02D 41/042* (2013.01); *F02B 39/10* (2013.01); *F02D 13/0215* (2013.01); *F02D 41/0002* (2013.01); *F02D 41/062* (2013.01); *F02D 41/401* (2013.01)

(58) Field of Classification Search
CPC ............... F02D 41/042; F02D 13/0215; F02D 41/0002; F02D 41/062; F02D 41/401; F02B 39/10
See application file for complete search history.

(56) References Cited

U.S. PATENT DOCUMENTS

| | | | | |
|---|---|---|---|---|
| 5,450,824 | A | * | 9/1995 | Yamane ................. F02D 13/023 123/90.15 |
| 5,794,586 | A | * | 8/1998 | Oda ....................... F02D 41/064 123/179.17 |
| 6,659,090 | B2 | | 12/2003 | Sisken |
| 6,763,298 | B2 | | 7/2004 | Boggs et al. |
| 8,955,494 | B2 | * | 2/2015 | Nakamura .......... B60W 30/192 123/90.15 |
| 9,284,920 | B2 | | 3/2016 | Leone et al. |
| 10,060,371 | B2 | | 8/2018 | Ulrey |
| 10,138,822 | B2 | | 11/2018 | Ulrey et al. |
| 10,393,041 | B2 | | 8/2019 | Ulrey et al. |
| 10,859,044 | B2 | * | 12/2020 | Dudar .............. F02M 35/10229 |
| 2004/0044461 | A1 | * | 3/2004 | Ueda .................... F02D 41/1498 701/111 |
| 2007/0068485 | A1 | * | 3/2007 | Hilditch ................ F02M 69/00 123/299 |

(Continued)

OTHER PUBLICATIONS

Heywood, Internal Combustion Engine Fundamentals, 1988, pp. 53-54 (Year: 1988).*

*Primary Examiner* — Carl C Staubach

(74) *Attorney, Agent, or Firm* — Vincent Mastrogiacomo; McCoy Russell LLP

(57) ABSTRACT

Systems and methods for operating an engine that is started via expansion stroke combustion are described. In one example, the method increases air flow through the engine during an engine stopping process so that a larger amount of air may be trapped in a cylinder that is on its expansion stroke so that greater amounts of engine torque may be provided during engine starting.

16 Claims, 3 Drawing Sheets

(56) References Cited

U.S. PATENT DOCUMENTS

| | | | |
|---|---|---|---|
| 2007/0209619 A1* | 9/2007 | Leone | B60W 10/08 |
| | | | 123/90.12 |
| 2009/0152027 A1* | 6/2009 | Kusaka | F02D 13/08 |
| | | | 180/65.28 |
| 2014/0026559 A1* | 1/2014 | Shinagawa | F02D 41/0007 |
| | | | 60/602 |
| 2017/0058795 A1* | 3/2017 | Schmitt | F02D 41/0042 |
| 2019/0203630 A1* | 7/2019 | Dudar | B60W 50/0097 |
| 2020/0300205 A1 | 9/2020 | Pursifull et al. | |

* cited by examiner

METHODS AND SYSTEM TO SHUTDOWN AN ENGINE

FIELD

The present description relates to methods and a system for stopping an engine that may be restarted using expansion stroke combustion.

BACKGROUND AND SUMMARY

An engine may be started combusting fuel during a compression stroke and into an expansion stroke. However, compression stroke combustion may delay engine starting since the engine has to rotate through some crankshaft angle after combustion is initiated in the engine before torque to increase engine speed may be generated via expanding gases in an engine cylinder. One way to reduce engine starting time may be to combust fuel in a cylinder that is on its expansion stroke. However, combusting fuel during an expansion stroke may not generate as much torque as may be desired to start the engine because the cylinder may contain exhaust gases. Therefore, it may be desirable to provide a way of starting an engine such that the engine starts quickly and generates a large amount of torque to increase engine speed up to idle speed.

The inventors herein have recognized the above-mentioned issues and have developed a method for operating an engine, comprising: ceasing fuel injection while the engine is rotating via a controller; and holding a waste gate open and holding a throttle open while the fuel injection is ceased and the engine is rotating.

By holding open a waste gate and a throttle after fuel injection to an engine has ceased, it may be possible to increase air flow through an engine as the engine comes to a stop so that a larger amount of fresh air may be trapped in a cylinder that is on its expansion stroke. The larger amount of trapped air may increase torque that is generated in the cylinder when the engine is started via expansion combustion in the cylinder. As a result, the engine may be started quickly and with a desirable level of torque output such that the engine may reach idle speed more quickly.

The present description may provide several advantages. In particular, the approach may reduce engine starting time. Further, the approach may improve engine speed run-up to idle speed. In addition, the approach may reduce engine starting emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to stopping and starting an engine. The engine may be stopped by ceasing to inject fuel to the engine and taking actions that increase air flow through the engine. By increasing the air flow through the engine, it may be possible to remove residual exhaust gases from the engine's cylinders so that the engine may generate more torque when the engine is started via expansion stroke combustion. The engine may be of the type shown in FIG. 1. The engine may be stopped according to the engine stopping sequence that is shown in FIG. 2. The engine may be stopped and started according to the method of FIG. 3.

Figure 1:
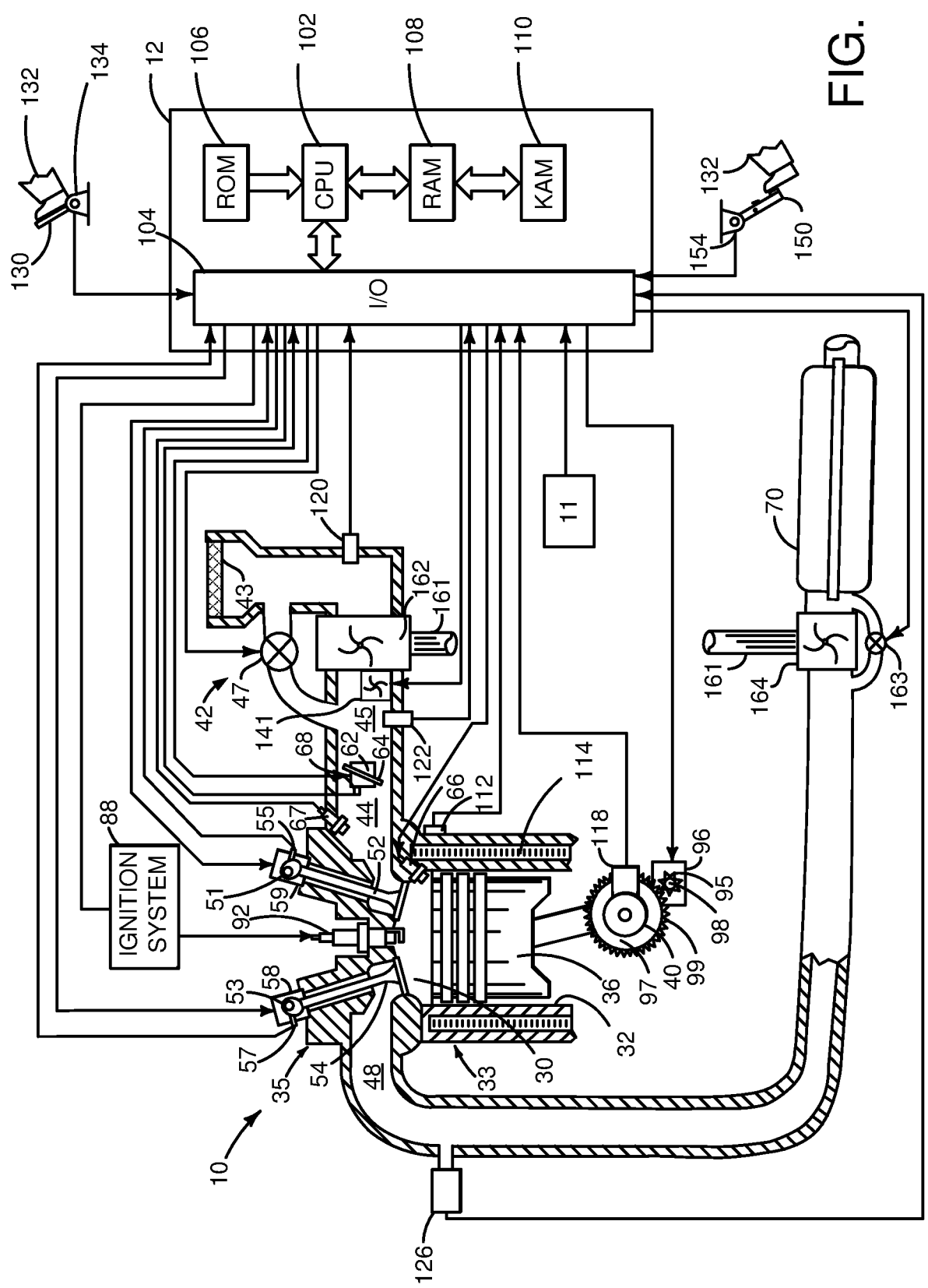
FIG. 1 is a schematic diagram of an engine.
Figure 2:
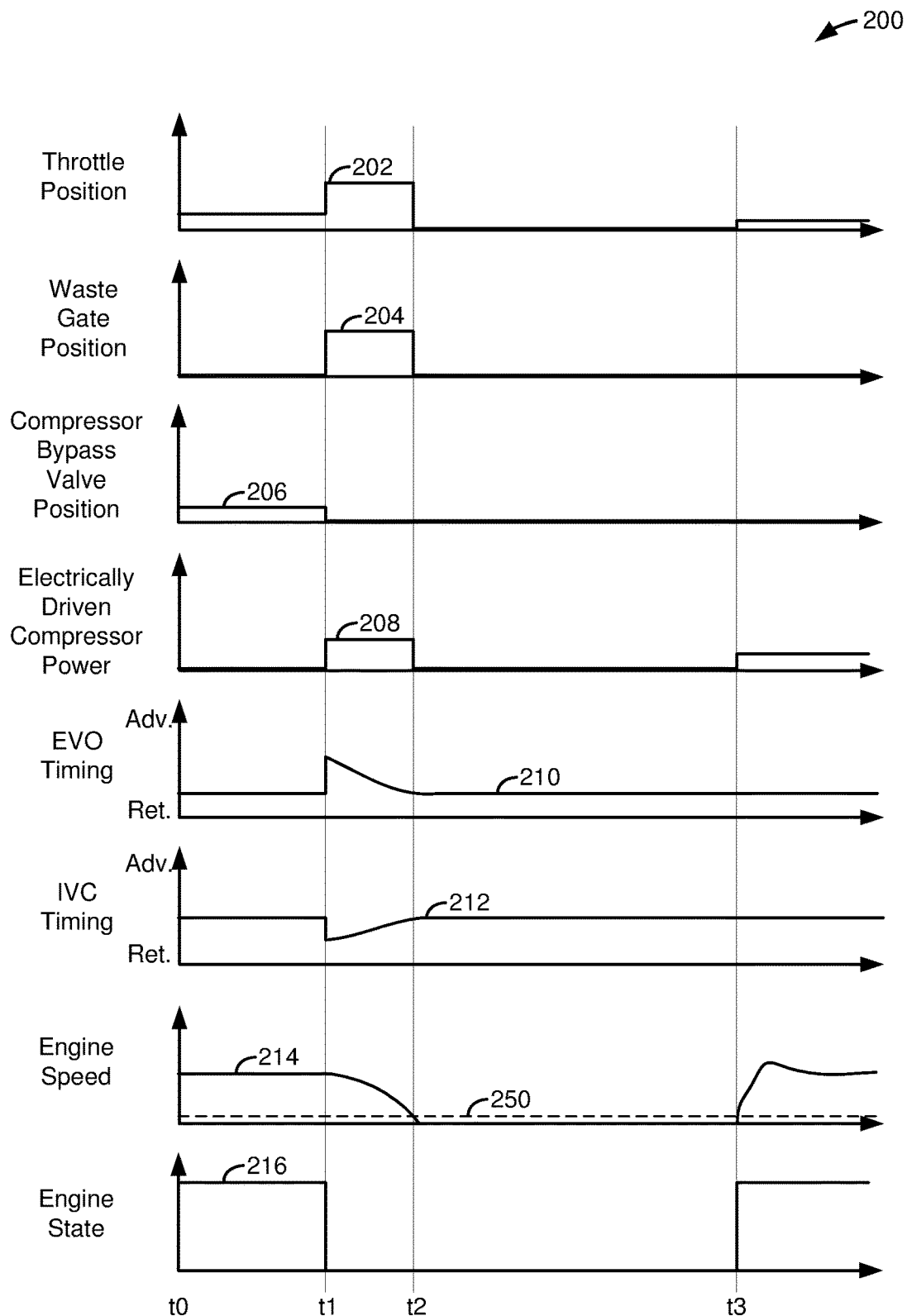
FIG. 2 shows example engine stopping sequence according to the method of FIG. 3.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Timing of opening and closing of intake valve 52 may be adjusted via variable valve timing device 59. Timing of opening and closing of exhaust valve 54 may be adjusted via variable valve timing device 58. Variable valve timing devices 58 and 59 may be electromechanical or electro-hydraulic devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162, electrically driven compressor 141, and engine air intake 42. In other examples, compressor 162 may be a supercharger compressor. Shaft 161 mechanically couples turbocharger turbine 164 to turbocharger compressor 162. Electrically driven compressor 141 may be activated, deactivated, and speed controlled via controller 12. Electrically driven compressor 141 may be powered via a battery (not shown). Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: an engine; an electric compressor; and a controller including executable instructions stored in non-transitory memory that cause the controller to cease injecting fuel to the engine and activate the electric compressor in response to an engine stop request. The system further comprises a compressor bypass valve, and additional instructions to close the compressor bypass valve in response to the engine stop request. The system further comprises a throttle for the engine, and additional instructions to open the throttle in response to the engine stop request. The system further comprises additional instructions to inject fuel to a cylinder of the engine while the cylinder is on its exhaust stroke in response to a request to start the engine. The system further comprises additional instructions to increase a speed of the electric compressor when the electric compressor is activated when the engine stop request is generated. The system further comprises a variable valve actuator and additional instructions to adjust the variable valve actuator in response to the engine stop request. The system includes where adjusting the variable valve actuator includes adjusting valve timing to reduce engine volumetric efficiency as engine speed decreases. The system includes where adjusting the variable valve actuator increases engine volumetric efficiency in response to the engine stop request.

Figure 3:
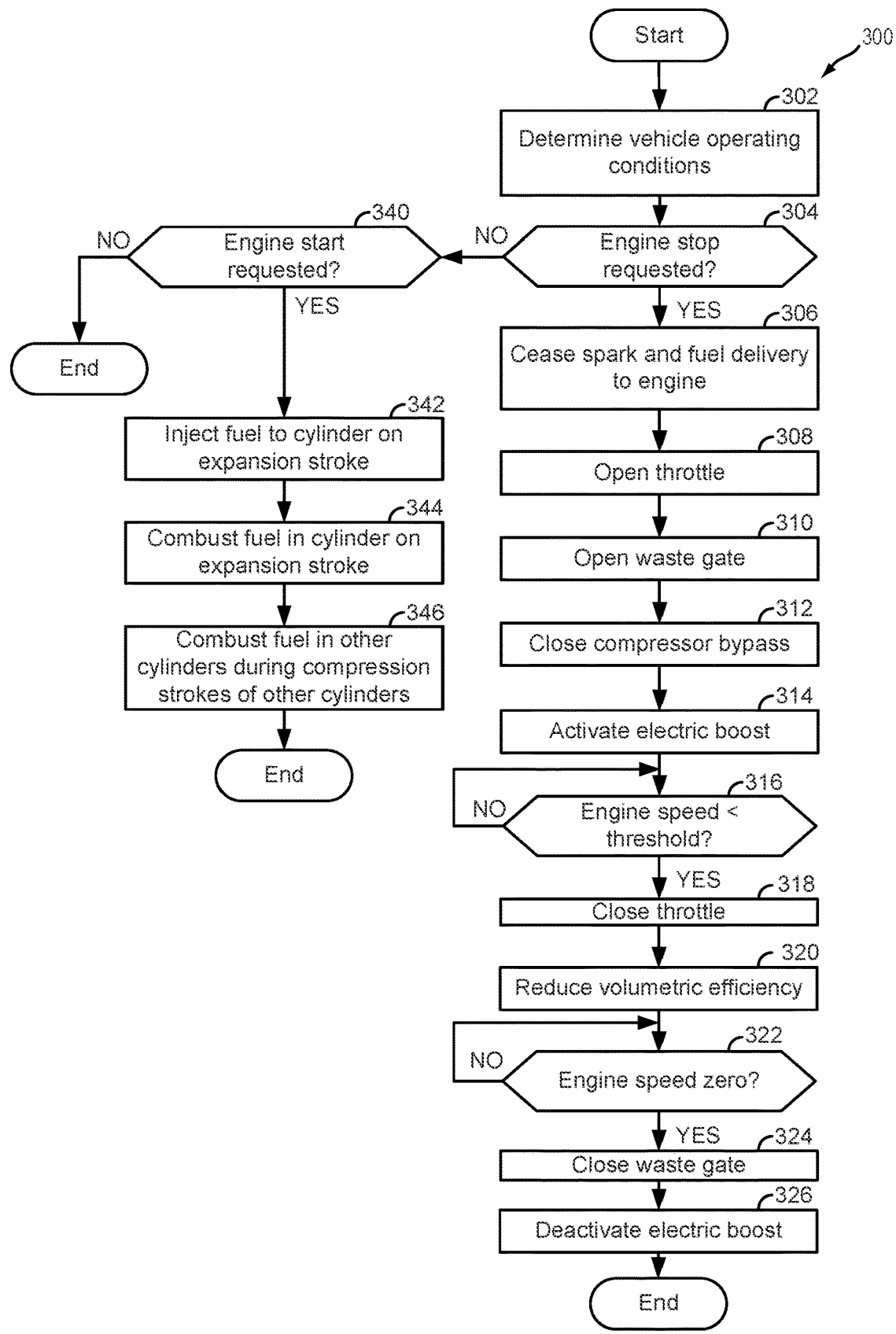
FIG. 3 shows an example method for stopping and starting an engine of the type shown in FIG. 1.

Turning now to FIG. 2, an engine stopping sequence according to the system of FIG. 1 and the method of FIG. 3 is shown. The example sequence may be provided by the system of FIG. 1 in cooperation with the method of FIG. 3. The plots are aligned in time and occur at a same time. The vertical lines at t0-t3 indicate times of particular interest.

The first plot from the top of FIG. 2 is a plot of engine throttle position versus time. The vertical axis represents engine throttle position and the engine throttle position increases (e.g., the throttle opens further) in the direction of the vertical axis arrow. The horizontal axis represents time and the time increases from the left side of the figure to the right side of the figure. Trace 202 represents the engine throttle position.

The second plot from the top of FIG. 2 is a plot of turbocharger waste gate position versus time. The vertical axis represents turbocharger waste gate position and turbocharger waste gate position increases in the direction of the vertical axis arrow. The horizontal axis represents time and the time increases from the left side of the figure to the right side of the figure. Trace 204 represents the turbocharger waste gate position.

The third plot from the top of FIG. 2 is a plot of a compressor bypass valve (e.g., 47) position versus time. The vertical axis represents the compressor bypass valve position and the compressor bypass valve position increases (e.g., the opening amount increases) in the direction of the vertical axis arrow. The horizontal axis represents time and the time increases from the left side of the figure to the right side of the figure. Trace 206 represents compressor bypass valve position.

The fourth plot from the top of FIG. 2 is a plot of electrically driven compressor power versus time. The vertical axis represents the electrically driven compressor power generated and the electrically driven compressor power level increases in the direction of the vertical axis arrow. The horizontal axis represents time and the time increases from the left side of the figure to the right side of the figure. Trace 208 represents the electrically driven compressor power level.

The fifth plot from the top of FIG. 2 is a plot of exhaust poppet valve opening time versus time. The vertical axis represents exhaust valve opening time and the exhaust valve opening time advances in the direction of the vertical axis arrow. The horizontal axis represents time and the time increases from the left side of the figure to the right side of the figure. Trace 210 represents the exhaust valve opening timing.

The sixth plot rom the top of FIG. 2 is a plot of intake poppet valve opening time versus time. The vertical axis represents intake valve opening time and the intake valve opening time advances in the direction of the vertical axis arrow. The horizontal axis represents time and the time increases from the left side of the figure to the right side of the figure. Trace 212 represents the intake valve opening timing.

The seventh plot rom the top of FIG. 2 is a plot of engine speed versus time. The vertical axis represents engine speed and the engine speed increases in the direction of the vertical axis arrow. The horizontal axis represents time and the time increases from the left side of the figure to the right side of the figure. Trace 214 represents engine speed. Horizontal line 250 represents a threshold engine speed below which the engine throttle opening amount may be reduced.

The eighth plot rom the top of FIG. 2 is a plot of engine state versus time. The vertical axis represents engine state and the engine state is active when trace 216 is at a higher level near the vertical axis arrow. The engine is not activated when trace 216 is at a lower level near the horizontal axis. The horizontal axis represents time and the time increases from the left side of the figure to the right side of the figure. Trace 216 represents engine state.

At time t0, the engine is activated and the engine speed is at a medium level. The throttle is partially open and the compressor bypass valve is partially open. The electrically driven compressor power is off and the exhaust valve opening (EVO) timing is mildly retarded. The intake valve opening (IVO) timing is also mildly retarded.

At time t1, an engine stop is requested and fuel injection to the engine ceases (not show). The throttle is opened after fuel injection ceases and the waste gate is opened so that flow out of the engine's cylinders may be improved. The electrically driven compressor is activated, EVO is advanced, and IVC is retarded. Retarding IVC may reduce push back of inducted air into the cylinder so that volumetric efficiency may be increased. Advancing EVO may reduce exhaust and intake valve overlap so that internal exhaust gas recirculation may be provided as engine speed is reduced. The engine speed begins to fall and the engine is indicated as being stopped although the engine crankshaft (not shown) continues to rotate.

Between time t1 and time t2, the engine speed steadily decreases while the throttle remains held open. The waste gate also remains held open and the compressor bypass valve remains held closes so that air flow through the engine may increase, thereby reducing exhaust residuals in the engine's cylinders. The electrically driven compressor also remains activated and EVO timing is retarded after it was initially advanced. The IVC timing is advanced after it was initially retarded. Adjusting EVO and IVC as engine speed decreases may reduce engine noise and vibration as engine speed is reduced. The engine remains deactivated.

At time t2, the engine speed is reduced to less than threshold speed 250 and the throttle is closed. The waste gate is also closed and the compressor bypass valve remains closed. The electrically driven compressor is deactivated and EVO timing and IVC timing are returned to nominal levels. The engine remains deactivated.

At time t3, an engine start is requested (not shown) and the engine is started via injecting fuel to a cylinder that is on an expansion stroke and combusting the fuel while the engine is on its expansion stroke (not shown). The throttle is partially opened and the waste gate is fully closed. The compressor bypass valve is fully closed and the electrically driven compressor is not activated. The EVO and IVC timings are at nominal levels and the engine speed begins to increase.

In this way, exhaust gases in engine cylinders may be flushed and replaced with fresh air when an engine is stopped so that engine starting via expansion stroke combustion may be improved. Further, air flow through the engine may be increased while the engine speed decreases via closing the waste gate, closing the compressor bypass valve, and activating the electrically driven compressor. Increasing air flow through the engine may also help to remove exhaust gases from the engine.

Turning now to FIG. 3, a flowchart of a method for operating an engine is shown. In particular, the method of FIG. 3 may be applied to stop and start an engine. The method of FIG. 3 may be incorporated into and may cooperate with the system of FIG. 1. Further, at least portions of the method of FIG. 3 may be incorporated as executable instructions stored in non-transitory memory while other portions of the method may be performed via a controller transforming operating states of devices and actuators in the physical world.

At 302, method 300 determines vehicle operating conditions. Vehicle operating conditions may be determined from the vehicle's various sensors and actuators. The vehicle operating conditions may include, but are not limited to engine speed, vehicle speed, driver demand torque, ambient air temperature, barometric pressure, and engine load. Method 300 proceeds to 304.

At 304, method 300 judges if an engine stop has been requested. Method 300 may judge that an engine stop is requested from input by vehicle occupants (e.g., applying a pushbutton or key switch) or based on vehicle operating conditions (e.g., driver demand torque, battery state of charge, vehicle speed, etc.). If method 300 judges that an engine stop is requested, the answer is yes and method 300 proceeds to 306. Otherwise, the answer is no and method 300 proceeds to 340.

At 340, method 300 judges if an engine start has been requested. Method 300 may judge that an engine start is requested from input by vehicle occupants (e.g., applying a pushbutton or key switch) or based on vehicle operating conditions (e.g., driver demand torque, battery state of charge, vehicle speed, etc.). If method 300 judges that an engine start is requested, the answer is yes and method 300 proceeds to 342. Otherwise, the answer is no and method 300 proceeds to exit.

At 342, method 300 injects fuel into a cylinder of the engine that is on its expansion stroke. The fuel may be injected when the engine is not rotating to direct start the engine. Alternatively, the fuel may be injected to a cylinder on its expansion stroke when the engine is rotating. In some examples, method 300 may also begin rotating the engine's crankshaft via a starter or other electric machine. Method 300 proceeds to 344.

At 344, method 300 combusts the injected fuel via supplying spark to the cylinder during the cylinder's expansion stroke. The combustion in the cylinder may cause the engine to start rotating. Method 300 proceeds to 346.

At 346, method 300 begins injecting fuel and combusting fuel in other cylinders. The fuel may be injected during the intake and/or compression strokes of the cylinders. In this way, the engine may be started via expansion combustion. Method 300 proceeds to exit.

At 306, method 300 ceases delivering spark and fuel to the engine's cylinders. The engine speed may be reduced shortly after fuel injection is ceased. Method 300 proceeds to 308.

At 308, method 300 opens the engine's throttle. The throttle may be partially opened or fully opened. Opening the throttle may raise intake manifold pressure so that more air may be pumped through the engine so that exhaust gases may be expelled from the engine. In addition, method 300 may increase engine volumetric efficiency via adjusting intake and/or exhaust valve timing. In one example, method 300 retards intake valve closing (IVC) timing from base timing to reduce pushback of air out of the engine's cylinders. In addition, or alternatively, method 300 advances exhaust valve closing (EVC) timing from base timing to reduce intake and exhaust valve overlap, thereby reducing internal exhaust gas recirculation. Method 300 proceeds to 310.

At 310, method 300 opens a turbocharger compressor waste gate to reduce exhaust back pressure. Consequently, exhaust gases may flow more freely from the engine to atmosphere. Method 300 proceeds to 312.

At 312, method 300 closes a compressor bypass passage so that a turbocharger compressor may increase pressure in the engine's intake manifold. Increasing the engine's intake manifold pressure may increase air flow through the engine. Method 300 proceeds to 314.

At 314, method 300 activates an electrically driven compressor and increases electrically driven compressor output. By increasing the output of the electrically driven compressor, air flow to the engine may be increased, thereby increasing purging of exhaust gases from the engine so that the engine may generate additional torque during a subsequent engine restart when fuel is injected into a cylinder on the cylinder's expansion stroke. Method 300 proceeds to 316.

At 316, method 300 judges if engine rotational speed is less than a threshold speed. In one example, the threshold speed may be a speed that is less than a predetermined speed, such as 500 RPM. If method 300 judges that engine rotational speed is less than the threshold speed, the answer is yes and method 300 proceeds to 318. Otherwise, the answer is no and method 300 returns to 316.

At 318, method 300 closes the engine throttle. Closing the engine throttle may reduce evaporative emissions. Method 300 proceeds to 320.

At 320, method 300 reduces the engine's volumetric efficiency to reduce engine noise and vibration as engine speed approaches zero. In one example, method 300 may advance intake valve closing (IVC) timing toward base timing to increase pushback of air out of the engine's cylinders. In addition, or alternatively, method 300 may retard exhaust valve closing (EVC) timing toward base timing to increase intake and exhaust valve overlap. Method 300 proceeds to 322.

At 322, method 300 judges whether or not engine rotational speed is zero. If so, the answer is yes and method 300 proceeds to 324. Otherwise, method 300 returns to 322.

At 324, method 300 closes the turbocharger waste gate. Closing the turbocharger waste gate may prepare the engine for restarting. Method 300 proceeds to 326.

At 326, method 300 deactivates the electrically driven compressor. By deactivating the electrically driven compressor, a rotational speed of the electrically driven compressor is reduced to zero and electric power is removed from the electrically driven compressor. Method 300 proceeds to exit.

In this way, exhaust gases may be expelled from an engine that may subsequently restart via expansion combustion. Expelling the exhaust gases may permit a larger fresh air charge during engine starting so that engine torque output may be increased.

Thus, the method of FIG. 3 provides for a method for operating an engine, comprising: ceasing fuel injection while the engine is rotating via a controller; and holding a waste gate open and holding a throttle open while the fuel injection is ceased and the engine is rotating. The method further comprises starting the engine via injecting fuel into a cylinder during an exhaust stroke of the cylinder. The method further comprises adjusting a volumetric efficiency of the engine while the engine is rotating and while fuel injection to the engine is ceased. The method includes where the volumetric efficiency of the engine is reduced as engine speed is reduced. The method includes where the volumetric efficiency is adjusted via adjusting poppet valve timing. The method includes where adjusting poppet valve timing includes advancing intake valve closing timing. The method includes where adjusting poppet valve timing includes retarding exhaust valve closing timing.

The method of FIG. 3 also provides for a method for operating an engine, comprising: ceasing fuel injection to the engine while the engine is rotating via a controller; increasing volumetric efficiency of the engine after ceasing fuel injection to the engine; and decreasing volumetric efficiency of the engine as engine speed decreases after increasing volumetric efficiency of the engine and ceasing fuel injection to the engine. The method further comprises supplying compressed air to the engine after ceasing fuel injection. The method includes where the compressed air is provided via an electric machine. The method further comprises holding open a waste gate after ceasing fuel injection to the engine. The method further comprises holding a throttle open after ceasing fuel injection to the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an engine, comprising:
in response to an engine stop request, ceasing fuel injection to cylinders of the engine while the engine is rotating via a controller;
holding a waste gate open while the fuel injection is ceased and the engine is rotating;
contemporaneously, retarding intake valve closing time from base intake valve timing and advancing exhaust valve closing time from base exhaust valve timing while the engine is rotating at a speed above a threshold speed; and
contemporaneously, advancing intake valve closing time and retarding exhaust valve closing time in response to engine rotational speed being less than the threshold speed and greater than zero.

2. The method of claim 1, further comprising starting the engine via injecting fuel into a cylinder during an expansion stroke of the cylinder.

3. The method of claim 1, further comprising holding a throttle open while the engine is rotating and while fuel injection to the engine is ceased.

4. The method of claim 3, where a volumetric efficiency of the engine is reduced as engine speed is reduced.

5. The method of claim 4, where the volumetric efficiency is adjusted via adjusting poppet valve timing.

6. A system, comprising:
an engine;
an electric compressor; and
a controller including executable instructions stored in non-transitory memory that cause the controller to cease injecting fuel to cylinders of the engine, activate the electric compressor, retard intake valve closing time of the engine from base intake valve timing and advance exhaust valve closing time of the engine from base exhaust valve timing while the engine is rotating in response to an engine stop request, and advance intake valve closing time and retard exhaust valve closing time in response to engine rotational speed being less than a threshold speed and greater than zero after ceasing injection of fuel to cylinders of the engine.

7. The system of claim 6, further comprising a compressor bypass valve, and additional instructions to close the compressor bypass valve in response to the engine stop request.

8. The system of claim 6, further comprising a throttle for the engine, and additional instructions to open the throttle in response to the engine stop request.

9. The system of claim 6, further comprising additional instructions to inject fuel to a cylinder of the engine while the cylinder is on its expansion stroke in response to a request to start the engine.

10. The system of claim 6, further comprising additional instructions to increase a speed of the electric compressor when the electric compressor is activated when the engine stop request is generated.

11. The system of claim 6, further comprising a variable valve actuator and additional instructions to adjust the variable valve actuator in response to the engine stop request.

12. A method for operating an engine, comprising:
ceasing fuel injection to cylinders of the engine while the engine is rotating via a controller in response to an engine stop request;
increasing a volumetric efficiency of the engine via retarding intake valve closing time of the engine from base intake valve closing timing and advancing exhaust valve closing time of the engine from base exhaust valve closing timing while the engine is rotating after ceasing fuel injection to the engine; and
decreasing volumetric efficiency of the engine via advancing intake valve closing time and retarding exhaust valve closing time in response to engine rotational speed being less than a threshold speed and greater than zero as engine speed decreases after increasing the volumetric efficiency of the engine and ceasing fuel injection to the engine.

13. The method of claim 12, further comprising supplying compressed air to the engine after ceasing fuel injection.

14. The method of claim 13, where the compressed air is provided via an electric machine.

15. The method of claim 12, further comprising holding open a waste gate after ceasing fuel injection to the engine.

16. The method of claim 12, further comprising holding a throttle open after ceasing fuel injection to the engine.

* * * * *